US012782796B2

(12) United States Patent
Grubbstrom et al.

(10) Patent No.: US 12,782,796 B2
(45) Date of Patent: Nov. 3, 2026

(54) CAMERA DEVICE

(71) Applicant: TOPGOLF SWEDEN AB, Danderyd (SE)

(72) Inventors: Carl Grubbstrom, Saltsjoo-boo (SE); Mattias Daniel, Taby (SE)

(73) Assignee: TOPGOLF SWEDEN AB, Danderyd (SE)

( * ) Notice: Subject to any disclaimer, the term of this patent is extended or adjusted under 35 U.S.C. 154(b) by 39 days.

(21) Appl. No.: 19/110,760

(22) PCT Filed: Sep. 11, 2023

(86) PCT No.: PCT/EP2023/074828

§ 371 (c)(1),
(2) Date: Mar. 11, 2025

(87) PCT Pub. No.: WO2024/056564

PCT Pub. Date: Mar. 21, 2024

(65) Prior Publication Data

US 2026/0072331 A1 Mar. 12, 2026

(30) Foreign Application Priority Data

Sep. 15, 2022 (SE) .................................. 2230291-3

(51) Int. Cl.
*G03B 17/55* (2021.01)
*G03B 17/08* (2021.01)
*G03B 17/12* (2021.01)

(52) U.S. Cl.
CPC ............ *G03B 17/55* (2013.01); *G03B 17/08* (2013.01); *G03B 17/12* (2013.01)

(58) Field of Classification Search
CPC ......... G03B 17/55; G03B 17/08; G03B 17/12
See application file for complete search history.

(56) References Cited

U.S. PATENT DOCUMENTS

| | | | | |
|---|---|---|---|---|
| 11,860,517 | B2 * | 1/2024 | Aonuma ............ | G02B 13/0065 |
| 2021/0341821 | A1 | 11/2021 | Zanganeh et al. | |
| 2022/0191353 | A1 | 6/2022 | Sekiya et al. | |

FOREIGN PATENT DOCUMENTS

| | | | |
|---|---|---|---|
| CN | 216599770 | U | 5/2022 |
| EP | 4261613 | A1 | 10/2023 |

(Continued)

OTHER PUBLICATIONS

International Search Report and Written Opinion in International Appln. No. PCT/EP2023/074828, mailed on Dec. 4, 2023, 13 pages.

*Primary Examiner* — Lin Ye
*Assistant Examiner* — Fayez A Bhuiyan
(74) *Attorney, Agent, or Firm* — Noréns Patentbyrå AB

(57) ABSTRACT

A camera device (100), comprising: a housing, defining an air inlet (160, 162) and an air outlet (164); an optically transparent component (103) coupled with the housing to form a first enclosure (110) into which water is unable to flow under an influence of gravity when the camera device (100) is in a mounted orientation for operational use; a guiding surface (166) associated with, or being part of, the air outlet (164), the guiding surface (166) being configured and arranged to direct air flowing out of the air outlet (164) toward or across the optically transparent component (103); and a camera (102), located inside the first enclosure (110) and arranged to receive light passing through the optically transparent component (103), wherein the housing defines a path (P) for the air from the air inlet (160, 162) to the camera (102) and then to the guiding surface (166).

21 Claims, 13 Drawing Sheets

(56) References Cited

FOREIGN PATENT DOCUMENTS

| | | | |
|---|---|---|---|
| JP | 2009094358 | A | 4/2009 |
| JP | 2016118714 | A | 6/2016 |
| JP | 2020136736 | A | 8/2020 |
| JP | 2021197598 | A | 12/2021 |
| KR | 101736299 | B1 | 5/2017 |
| KR | 20220078818 | A | 6/2022 |
| WO | WO 2008033008 | A2 | 3/2008 |

* cited by examiner

CAMERA DEVICE

BACKGROUND

The present invention relates to a camera device, and in particular to a camera device for outdoors mounting. The present camera device is specifically useful for being mounted at a sports facility, such as at a baseball field or a golf driving range.

It is well-known to mount cameras in outdoor environments where they are subjected to moisture and varying temperatures. For reliable use during prolonged periods of time, it is generally necessary that such cameras are sufficiently sturdy and moisture resistant. Typically, camera units contain electronics and optics, and require wired connections such as power and/or communication cabling.

Other challenges to such cameras include keeping a clear view, via a lens of the camera. Both moisture and insects risk disturbing the view.

Particular problems arise in connection with cameras used at sports facilities, in particular with respect to cameras used for automatic tracking of moving objects, such as baseballs or golf balls. Such cameras may need to be sturdy enough to withstand accidental impacts from such moving objects.

U.S. Pat. No. 9,217,864 B2 discloses an automatic lens-cleaning system for rear view cameras in vehicles, based on pressurized air being blown across the lens to clean it.

US 2010/0139290 A1 discloses a surveillance unit having a camera. A protective cover is used, and cooling air is directed to components within the cover.

US 2004/0125558 A1 discloses an enclosure having a motherboard with electric components. The components are cooled using a fan causing an air flow.

US 2019/0331509 A1 discloses a roof-mounted sensor assembly for a car. The assembly includes a cooling channel in a housing, the cooling channel comprising a drain passage for moisture.

SUMMARY

The subject matter described in this specification can solve one or more of the above described problems, in providing a camera device that is sturdy and element-resistant enough to be mounted permanently and unprotected in an outdoor environment, so as to provide reliable camera operation during prolonged periods of time.

Hence, the invention can be embodied in a camera device, comprising a housing, defining an air inlet and an air outlet; an optically transparent component coupled with the housing to form an enclosed space into which water is unable to flow under an influence of gravity when the camera device is in a mounted orientation for operational use; a guiding surface associated with, or being part of, the air outlet, the guiding surface being configured and arranged to direct air flowing out of the air outlet toward or across the optically transparent component; and a camera located inside the enclosed space and arranged to receive light passing through the optically transparent component, wherein the housing defines a path for cooling the air from the air inlet to the camera and then to the guiding surface.

In some embodiments, a part of the path passing through the enclosed space is defined to run from electric circuitry associated with the camera to the camera.

In some embodiments, the camera device further comprises a fan configured to forcibly circulate said air along said path.

In some embodiments, the camera device comprises a first enclosure defining, together with said optically transparent component, said enclosed space and a moisture-open second enclosure. The path may be defined at least partly between the first enclosure and the second enclosure.

In some embodiments, the first enclosure and the second enclosure may be arranged in relation to each other so that no water is able to, under influence of gravity, run into the first enclosure from the second enclosure when the camera device is in said mounted orientation.

In some embodiments, the camera device comprises a cable connecting, at a connecting point, to the first enclosure and passing between the first enclosure and second enclosure through a first space. The cable may be arranged to guide moisture away from the connecting point.

In some embodiments, the cable forms a U-shape inside said first space.

In some embodiments, the cable exits the second enclosure at a lead-through hole of the second enclosure arranged on a top part of the second enclosure, so that the cable runs in a straight or oblique direction upwards through said lead-through hole when the camera device is in said mounted orientation.

In some embodiments, the cable connects detachably to the first enclosure.

In some embodiments, the first space is a camera device service space, accessible via a closable door in the second enclosure.

In some embodiments, the air inlet is configured to allow water to drain therethrough from said first space when the camera device is in said mounted orientation.

In some embodiments, the first enclosure and the second enclosure together form a second space in the form of a double-walled enclosure.

In some embodiments, the first enclosure and/or the second enclosure comprises a respective cylindrical part.

In some embodiments, said cylindrical part is an extruded aluminum part.

In some embodiments, said extruded aluminum part constitutes part of both the first enclosure and the second enclosure.

In some embodiments, the camera device comprises connecting walls, connecting the first enclosure to the second enclosure. The connecting walls may divide the second space into several compartments, extending in an axial direction of said cylindrical part.

In some embodiments, the path passes through said second space upstream of a point where the cooling air enters the first enclosure and/or downstream of a point where the cooling air exits the first enclosure.

In some embodiments, the path passes between said second space downstream of a point where the cooling air exits the first enclosure and upstream of the guiding surface via a channel defined by a wall of the second enclosure facing upwards in a mounted orientation of the camera device.

In some embodiments, the camera device comprises air filters through which the cooling air must pass as it enters into and/or exits from the camera device, the air filters may be open-pore foam filters, pleated filters with paper or metal mesh material filters.

In some embodiments, the camera device is arranged to be mounted in an outdoor environment for visualizing a trajectory of a moving object and to provide image information regarding said visualization via said cable.

In some embodiments, the moving object is a golf ball.

The invention can also be embodied in a system for automatically tracking sports balls based on collected image data of sports balls travelling through space. The system may comprise several camera devices of said type.

In the following, the invention will be described in detail, with reference to exemplifying embodiments of the invention and to the enclosed drawings, wherein:

BRIEF DESCRIPTION OF THE DRAWINGS

All Figures share the same reference numerals for same or corresponding parts.

DETAILED DESCRIPTION

Figure 1:
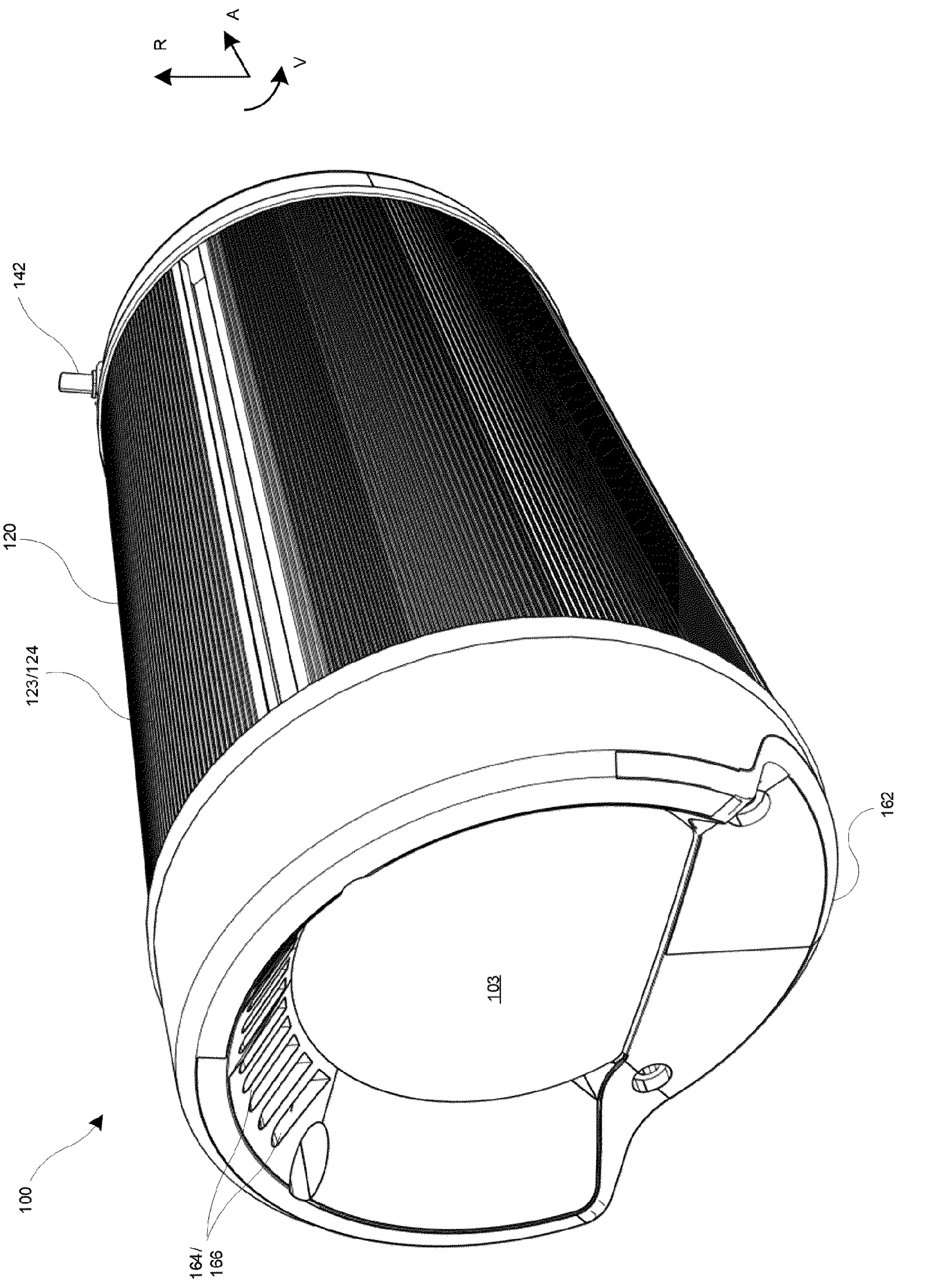
FIG. 1 is a top front perspective view of a camera device according to a first embodiment.

As is illustrated in the Figures, a camera device 100 comprises a camera 102. The camera 102 comprises a lens part 103. The lens part 103 may be an optical lens of the camera 102, or a transparent protective cover, such as a glass or plastic cover, arranged to protect such an optical lens. More generally, the camera device 100 comprises a transparent component such that the camera 102 is arranged to receive light passing through the optically transparent component. Hence, the lens part 103 may constitute or be comprised in said optically transparent component. In the Figures, the lens part and the optically transparent component are commonly denoted by reference numeral 103.

It is realized that the camera 102 may (and typically will) comprise several optical lenses, together arranged to provide desired optical properties to the camera 102. It is also realized that the transparent component 103 may then be an outer-most (front-most) lens, or a transparent protective cover arranged to protect such an outer-most lens from dust, scratching, and so forth.

The camera 102 can in itself be any suitable camera, but is preferably a digital camera, arranged to provide digital image information, in any suitable digital format, regarding still or moving images captured by the camera 102 to a consumer of such image information. The image information may be pre-processed or delivered in raw format.

The camera 102 may be associated with, or comprise, electric circuitry 101, such as driving circuitry and digital data processing circuitry for processing image information. The camera 102 and any circuitry 101 may each be conventional as such, and will not be described in detail herein.

The image information may be delivered wirelessly to said consumer, via any suitable wireless protocol such as Bluetooth® or WiFi, or be delivered via a cable 142 connecting to the camera device 100. The camera 102 and any circuitry 101 may be powered using an internal battery (not shown), or via cable 142. Hence, the cable 142 may be a data and/or power cable, or the cable 142 may in fact comprise several co-located conductors for such different purposes or be in the form of several separated cables 142. In the latter case, each such separate cable 142 may be as generally described herein below.

The cable 142 may be a conducting cable, arranged to conduct electric current. Alternatively or in addition the cable 142 may be an optical cable, arranged to carry a light signal.

The transparent component 103 is arranged so that externally originating light passes through the transparent component 103 to be captured by a light sensor of the camera 102 to form said image data.

The camera device 100 is associated with an axial (longitudinal) direction A, a radial direction R and an angular direction V. The camera device 100 may be generally cylindrical, such as generally circular-cylindrical, but may also have other general shapes.

The camera device 100 may be suitable for, and specifically arranged to, be mounted in an outdoor environment, even in a location without a roof or other externally provided mechanical protection from precipitation incoming from above the camera device 100. Such mounting of the camera device 100 may be in a “mounted orientation” of the camera device 100, in which the camera 102 is oriented to capture images from a direction of incident light being roughly horizontal or slightly downwards inclined in relation to the camera device 100, so that the camera device 100 captures image information roughly at or below a current mounting height of the camera device 100. In this mounted orientation, a top part 123 of the camera device faces upwards.

The camera device 100 may be arranged for, when hence mounted, visualizing a trajectory of a moving object and to provide image information regarding said visualization in said manner, such as via said cable 142. The moving object may be a sports ball, such as a baseball or a golf ball.

Specifically, the camera device 100 may be part of a system for automatically tracking of sports balls, such as golf balls, based on collected image data of such sports balls travelling through space. Then, the system comprises several camera devices 100 of the present type. Each sports ball may be monitored by one or more (e.g., several) such camera devices 100. In the latter case, image information from several such camera devices 100 may be combined, in the system, so as to determine a 3D trajectory of the sports ball in question. Such systems for automatic tracking of sports balls based on digital image information are well-known, and will not be described in detail herein.

In preferred embodiments, each camera device 100 is arranged to be mounted so as to monitor a location from which sports balls are shot or launched, such as a tee on a golf course or a bay at a golf driving range. Alternatively, any camera device 100 may be mounted to monitor an expected landing site of such sports balls, or any mid-air location for such sports balls. For instance, one or more (e.g., several) camera devices 100 of the present type may be mounted at a golf green to monitor golf balls landing in connection to, or on, the green.

Such mounting of the camera device 100 can be a permanent mounting. Moreover, other activities can be monitored by the camera device(s) 100, such as monitoring the players engaged in the sporting activity.

In order to provide a reliable and resilient operation under harsh outdoor conditions, where the camera device 100 may also be exposed for impacts from sports balls of said type, the present invention proposes a number of design principles that interact to keep the camera 102 and circuitry 101 cooled and dry, and to keep the camera device 100 protected from mechanical impact shocks.

In general, the camera device 100 is cooled using a circulating air flow, flowing along a path P from one or more (e.g., several) air inlets 160, 162 to one or several air outlets 164. The air flow along the path P may be driven by a temperature gradient occurring due to heat emitted from the camera 102 and/or circuitry 101 and/or sunlight absorbed by the top part 123. However, in some embodiments the air flow along the path P is forced by a fan 141. Note that, in FIGS. 1-9, the fan 141 is not shown, but instead the space where the fan 141 will be located.

The camera device 100 comprises a housing, in turn defining an air inlet 160, 162 and an air outlet 164.

The optically transparent component 103 is coupled with the housing to form an enclosed space into which liquid water is unable to flow under an influence of gravity when the camera device 100 is in said mounted orientation, for operational use.

The enclosed space can be configured so that liquid water is unable to flow into the enclosed space in different ways. For instance, and as will be exemplified herein, the housing and the optically transparent component 103 may jointly define barriers that liquid water needs to pass in order to enter into the enclosed space, the barriers forcing such water to move against gravity. This way, even if relatively large amounts of liquid water is supplied from above onto the camera device 100, no such water will enter into the enclosed space as a consequence of gravitational movement of such water.

In some embodiments, the housing may be configured to allow liquid water to enter the housing. Then, the housing may be configured to define a flow path for such liquid water entering into the housing, the flow path for liquid water configured to lead such liquid water, under the influence of gravity, to one or several draining holes for draining the liquid water out of the housing instead of entering the enclosed space.

Generally, the enclosed space may comprise through holes leading into and out of the enclosed space and via which said cooling air will pass on its way along said path P. Then, the enclosed space is configured in any of the ways mentioned above so that no liquid water will be able to, under the influence of gravity, enter into the enclosed space via such through holes.

The camera device 100 illustrated in the Figures comprises a first enclosure 110. Together with the optically transparent component 103, the first enclosure 110 then defines said enclosed space. In this case, the first enclosure 110 is comprised in said housing. The housing may also comprise the below-described second enclosure 120.

The enclosed space is moisture-proof in the below-defined sense (see also FIG. 6). The enclosed space contains (encloses) the camera 102, and preferably also any circuitry 101 and any other equipment of the camera device 100 that needs cooling and/or protection from moisture.

That the enclosed space encloses the camera 102 means that the camera 102 is completely contained in the enclosed space. The first enclosure 110 may also enclose the camera 102, but a peripheral surface (such as the transparent component 103) of the camera 102 may then form a peripheral surface of the first enclosure 110 also to achieve said enclosing, and correspondingly regarding any enclosed circuitry 101. Any such peripheral surface of the camera 102 may then be water-tight, so as not to allow any liquid water to pass into the first enclosure 110 via such peripheral surface or joint between such peripheral surface and the first enclosure 110.

Hence, the moisture-proof enclosed space may be an internal space defined by the camera 102 (and any circuitry 101) and the first enclosure 110 in combination.

That the enclosed space is "moisture-proof" does not generally mean that the enclosed space is completely sealed off so that no moisture can enter into the enclosed space. In fact, it is preferred that the path P runs through the enclosed space, so that the cooling air comes into direct physical contact with the camera 102 and/or any circuitry 101. Rather, the moisture-proofness of the enclosed space may be achieved by the first enclosure 110 and a second enclosure 120 of the camera device 10 being arranged in relation to each other so that no water is able to, by gravity, run into the first enclosure 110 from the second enclosure 120 when the camera device 100 is in said mounted orientation. Such arrangements will be exemplified below, but generally the moisture-proofness is achieved by the second enclosure 120 being arranged so that any liquid water entering the second enclosure 120 but not the first enclosure 110 drains from the second enclosure 120 by gravity when the camera device 100 is in a mounted orientation, and that an opening between the first 110 and second enclosures 120 is arranged so that no water can run from the second enclosure 120 to the first enclosure 110 but instead drains from the second enclosure 120. The control of how any water runs when the camera device 100 is in said mounted orientation can be achieved by internal barrier walls or in any other suitable manner, as is exemplified herein and in the drawings.

The first enclosure 110 may be designed so that no moisture can enter into the first enclosure 110, and reach the camera 102, apart from such an opening (that does not allow liquid water to travel, by gravity, through the opening in question) between the first enclosure 110 and the second enclosure 120. The path P may run through said opening between the first enclosure 110 and the second enclosure 120.

Figure 7:
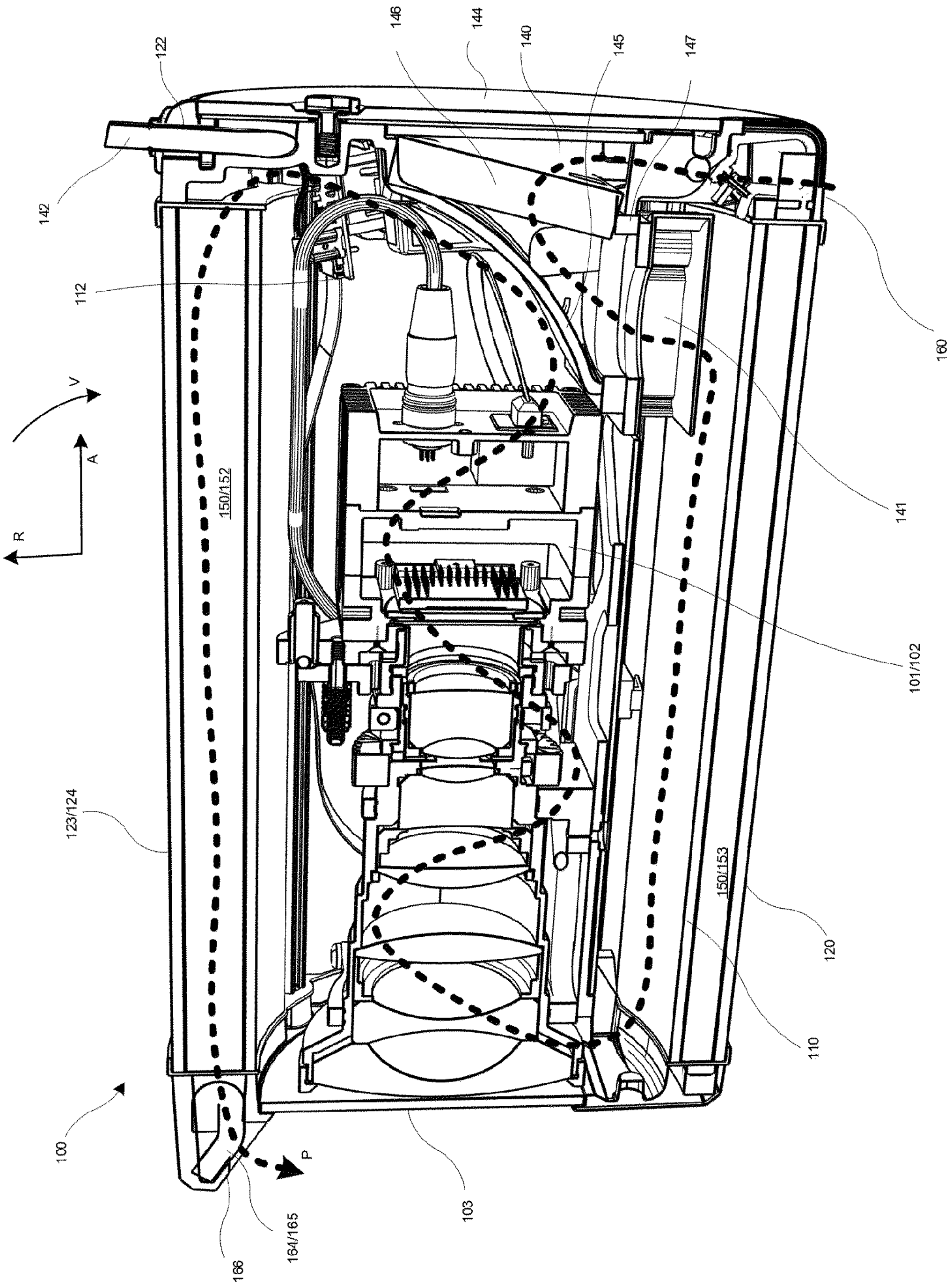
FIG. 7 is a cross-sectional side perspective view of the camera device illustrated in FIG. 1, showing a cooling air path.

As mentioned, the camera device 100, and more particularly said housing, defines the path P for cooling air (FIG. 7). The path P is defined to force cooling air to first thermally contact the camera 102, and possibly also any circuitry 101, thereby cooling the camera 102 (and possibly also circuitry 101) by the cooling air being heated. In some embodiments, control circuitry 101 is arranged upstream of the camera 102 (not including the circuitry 101 in question) along the path P. The path P can be defined to actively direct the cooling air to the circuitry 101 to thereby cool the circuitry 101.

The path P is furthermore defined so that the cooling air (after being heated by passing through the first enclosure 110 and the camera 102) thereafter passes the transparent component 103. The heated cooling air may pass an internal surface of the transparent component 103 before exiting the camera device 100 via an air exit. This counteracts any frost and condensate on the internal surface of the transparent component 103.

It is preferred (as is illustrated in the Figures) that the heated cooling air passes an external surface of the transparent component 103. In particular, the heated cooling air may be exhausted from the camera device 100 via one or more air outlets 164 comprising at least one air guiding surface 166 associated with, or being part of, the air outlet 164, the guiding surface 166 furthermore being configured and arranged to guide the exhausted, heated cooling air flowing out of the air outlet 164 toward or across the optically transparent component 103. Hence, a part of the path P may be along the external surface of the transparent component 103. As is shown in FIGS. 1-9, the guiding surface 166 may be in the form of a flange or other protruding part forcing the exhausting air, leaving air outlet 164, to travel in a direction substantially parallel to, or even towards, said external transparent component 103 surface before dispersing due to convection.

In FIGS. 7, 10-12 and 15, the path P is illustrated as a back and forth flow through the first enclosure 110. This does not mean that the air necessarily flows in a back and forth manner, but rather illustrates the fact that the air flows through the first enclosure 110 so as to come into thermal contact with the various entities arranged therein. The air flow through the first enclosure 110 may be an at least locally turbulent air flow, due to geometries of entities enclosed in the first enclosure 110.

Using such a combination between a moisture-proof first enclosure 110 accommodating the camera 102 and heated cooling air being forced to physically interact with the transparent component 103 provides reliable operation, since the transparent component 103 will be heated, resulting in any condensed moisture on the transparent component 103 evaporating. By directing the heated cooling air to the external surface of the transparent component 103, this effect is amplified by the convection of heated air onto the transparent component 103. Also, any contaminating insects, such as web-building spiders, will be discouraged to dwell on or in connection to the transparent component 103.

These effects are substantial, since the camera device 100 is arranged for long-term (such as permanent) installation in outdoor environments and are associated with high requirements in terms of image quality and reliability.

As mentioned, the camera device 100 may further comprise said second enclosure 120. The second enclosure 120 may be a moisture-open enclosure.

That the second enclosure 120 is "moisture-open" means that it is not designed to be completely impenetrable to moisture. In particular, it is not sealed in a manner preventing any liquid water from entering the second enclosure during prolonged exposure to damp conditions outdoors, such as rain, when in said mounted orientation. In other words, during normal use, liquid water may enter into the second enclosure 120 from outside of the camera device 100. However, and as described above, liquid water entering into the second enclosure 120 is prevented from entering the above-discussed enclosed space, such as entering the first enclosure 110, and thereby to come into contact with the camera 102 and any circuitry 101 inside the first enclosure 110 when the camera device 100 in said mounted orientation, since such liquid water will drain from the second enclosure 120 before being able to reach the first enclosure.

Water vapor present in the second enclosure 120 is less of a problem, since the camera 102 and any circuitry 101 present inside the enclosed space (first enclosure 110) during operation will result in a locally elevated temperature inside the enclosed space. Hence, water vapor entrained into the enclosed space, such as into the first enclosure 110, will generally not, or only to a limited extent, form condensate on the camera 102 and circuitry 101, such condensate normally negatively affecting these components.

The path P may generally go from the second enclosure 120 or space 140 (see below) via the first enclosure 110 and out, or from the second enclosure 120 or space 140 via the first enclosure 110 and further again via the second enclosure 120, and then out.

Further generally, the path P for cooling air may be defined at least partly between the first enclosure 110 and the second enclosure 120, such as between a wall of the first enclosure 110 and a wall of the second enclosure 120.

Figure 2:
FIG. 2 is a top back perspective view of the camera device illustrated in FIG. 1.
Figure 3:
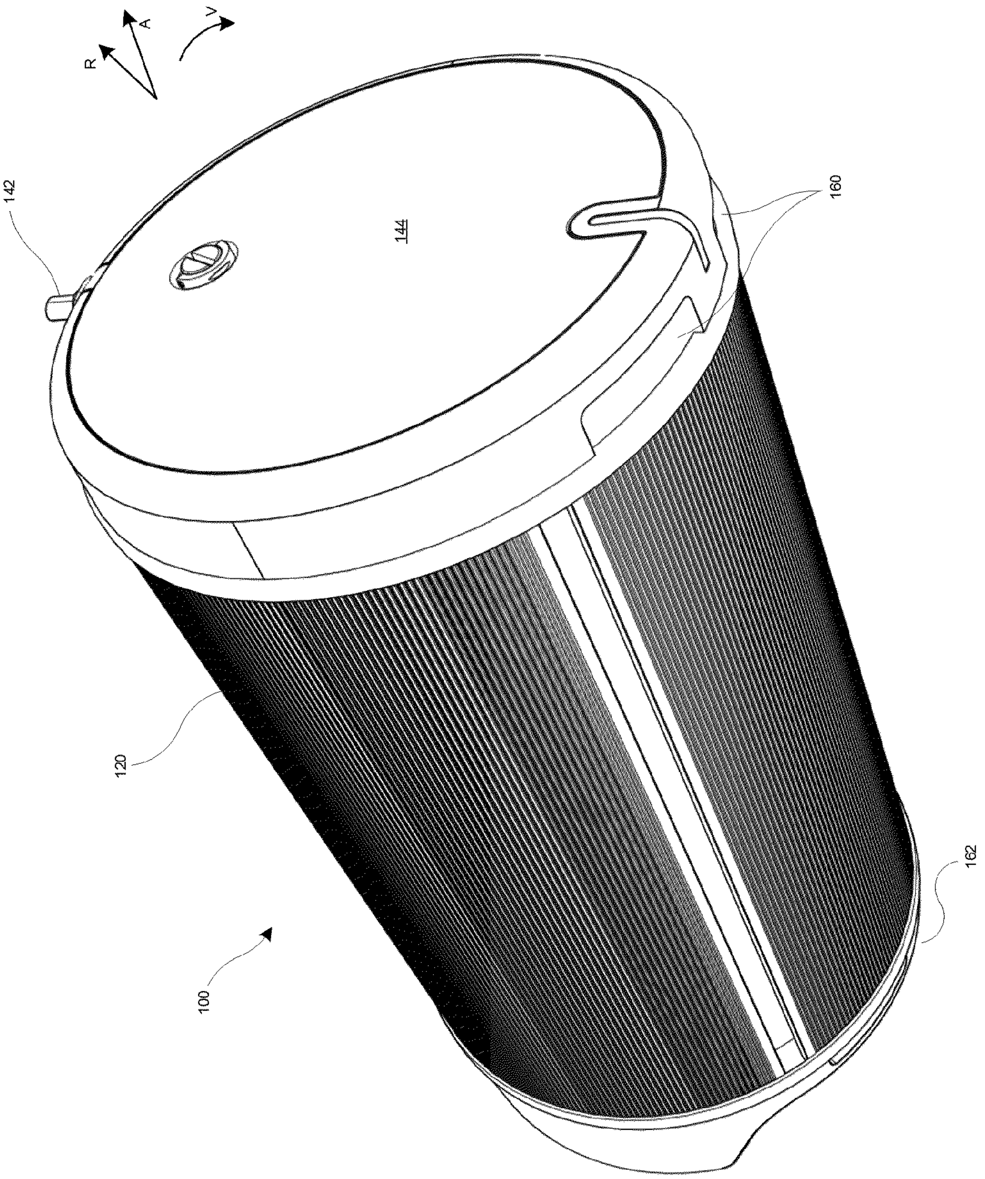
FIG. 3 is a bottom back perspective view of the camera device illustrated in FIG. 1.

FIGS. 1-3 show a camera device 100 from different angles, where the second enclosure 120 forms an outer enclosure of the camera device 100. As is illustrated, the second enclosure 120 may be formed as a generally circular cylindrical body, having an outer envelope surface with axial ribs.

As is perhaps best illustrated in FIGS. 4-7 and 9, the camera device 100 further comprises said cable 142, which may be one or several of a digital data cable, an analog signal cable, and a power cable. There may hence be more than one cable 142 (e.g., several cables 142), as explained above.

The cable 142 needs to run through an outer enclosure of the camera device 100. Since the cable 142 may connect to the camera 102 and/or any circuitry 101, located inside the first enclosure 110, the cable 142 may be arranged to pass both the first enclosure 110 periphery and the second enclosure 120 periphery. In the embodiments illustrated in the Figures, and as mentioned, the second enclosure 120 is also the outer periphery of the camera device 100. A lead-through hole 122 of the cable 142 through the second enclosure 120 therefore constitutes a risk with respect to liquid water entering the camera device 100 via the lead-through hole 122. Conventionally, this is solved by the cable 142 lead-through hole 122 being arranged on a bottom side of the camera device 100, where it may be protected from running rain water entering through the hole 122.

However, the cable 142 exiting from the camera device 100 poses a risk for damages to the cable 142 if the camera device 100 is struck by a sports ball, such as a golf ball, from below. Therefore, it is preferred that the cable 142 lead-through hole 122 is located at the top part 123 of the second enclosure 120, where it is protected from sports balls impacting from below.

More particularly, the cable 142 may exit the second enclosure 120 at the lead-through hole 122 of the second enclosure 120 arranged on the top part 123 of the second enclosure 120, so that the cable 142 runs in a straight or oblique direction upwards through said lead-through hole 122 when the camera device 100 is in the mounted orientation.

As is understood, the cable 142 may connect, at a connecting point 143, to the first enclosure 110. Moreover, the cable 142 may pass through a first space 140 on its way between the first enclosure 110 and second enclosure 120, up to said lead-through hole 122. The connecting point 143 may be a cable socket for detachable connection to a connector of the cable 143. In FIGS. 1-9, the connecting point 143 is illustrated as an ethernet cable connector, but it is realized that the connecting point 143 may be a USB (Universal Serial Bus) port or any other standard or custom digital or analog communication port; and/or a standard or custom electricity socket and/or an optical cable socket. Preferably, the connecting point 143 is in the form of a digital data communication port supporting electric power transfer, such as a PoE (Power over Ethernet) ethernet connector or a USB-C connector. The connecting point 143 of the first space 140 corresponds to a cable connector 112 of the first enclosure 110 (the cable connector being of said type).

This first space 140 may be formed as a part of a total space between the first enclosure 110 and the second enclosure 120, and it may be completely contained in the second enclosure 120. The first space 140 may furthermore be completely sealed, such as in a liquid-proof manner, from an interior of the first enclosure 110, apart from an open access hole via said fan 141. As is illustrated in FIGS. 1-9, the first space 140 may be located at a rear end (axially A opposite to a front end at which the transparent component 103 is located) of the camera device 100.

The above-mentioned moisture-openness of the second enclosure 120 may be provided by the lead-through hole 122 constituting a risk of liquid water entering into the second enclosure 120 from above via the lead-through hole 122.

It is realized that the air inlets 160, 162 and outlets 164, being formed in the second enclosure 120, also provide such moisture-openness of the second enclosure 120. However, the air outlet 164 is preferably designed in a rain-protected manner when the camera device 100 is in the mounted orientation, so that no liquid water can run, by gravity, in through the air outlet 164, into the second enclosure 120. The air inlets 160, 162 open downwards when the camera device 100 is in the mounted orientation, so that liquid water drains therethrough rather than entering therethrough.

Figure 13:
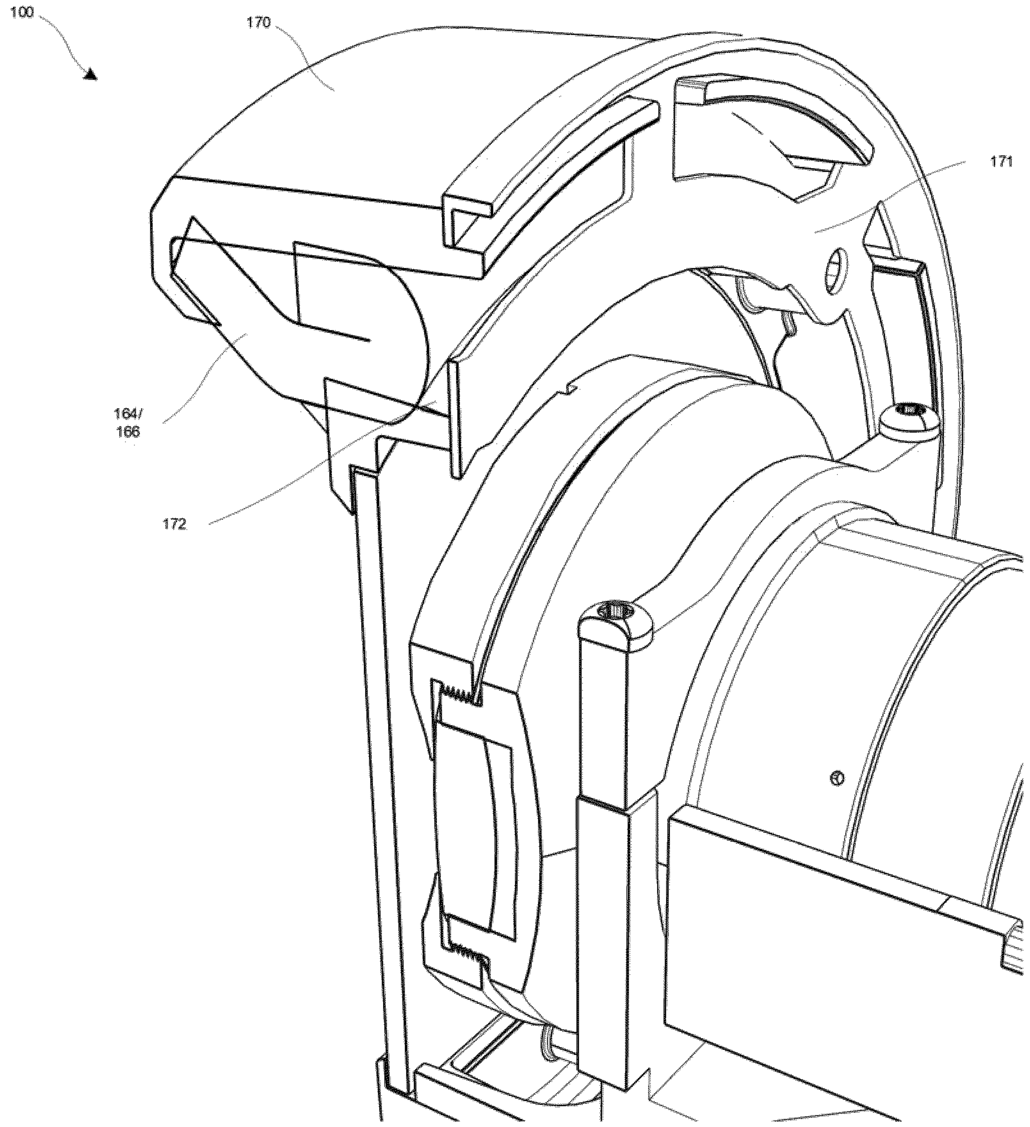
FIGS. 13-14 are partly removed perspective views of the camera device illustrated in FIG. 1, illustrating a front part draining solution.
Figure 14:
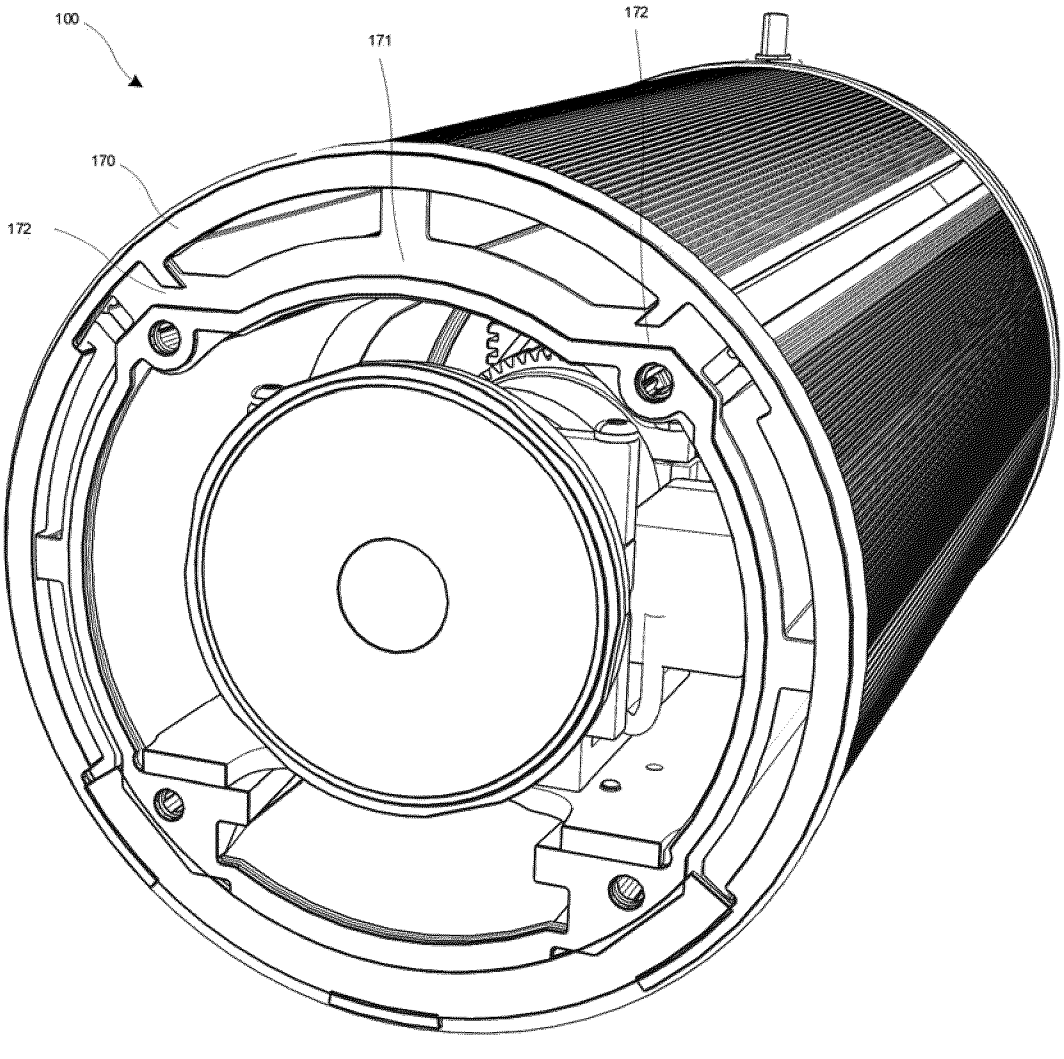

For instance, water may enter forcibly from below via the air outlet 164, such as from a water sprinkler. As is illustrated in FIGS. 13 and 14, If water enters via air outlet 164 the kinetic energy of the water is absorbed by the filter 165. There is a sealing gasket 171 between a front cap 170 of the camera device 100 and the second enclosure 120 cylindrical part. This sealing gasket 171 also acts as a threshold, by it defining a step for any water contained in the front cap 170 to enter the second space, and more particularly the upper channel 152 upwards confined by the second enclosure 120. The water is hence prevented from entering channel 152. Instead, the water can drain via side-directed draining channels 172 to drain via the second air inlet 162 below the air outlet 164.

Generally, the front cap 170 may be manufactured from a sturdy material, such as a metal material, such as aluminum. It may be designed so that the sturdy material protects filter 163 and/or filter 165. For instance, the filter 163 and/or 165 in question may be embedded in a filter-accommodating recess of the body of the sturdy material. This is illustrated in the Figures.

In order to prevent liquid water entering into the second enclosure 120 to accidentally reach and enter into the first enclosure 110, the cable 142 may be arranged to guide moisture, preferably liquid water, in particular liquid water having entered via the lead-through hole 122, away from the connecting point 143 and preferably to a location where the liquid water is drained from the first space 140 by gravity.

This may be achieved in various ways, but preferably involves having the cable 142 itself extend according to a predetermined pattern inside said first space 140. It is understood that this predetermined pattern results in liquid water being guided in said manner, by gravity, along the cable 142, when the camera device 100 is in said mounted orientation.

The cable 142 may extend downwards, in said mounted orientation, from the connecting point 143. The cable 142 may also extend downwards, in said mounted orientation, from the lead-through hole 122.

As is exemplified in the Figures, the cable 142 may also form a U-shape inside the first space 140, the bottom of the U-shape facing downwards in said mounted orientation.

Figure 4:
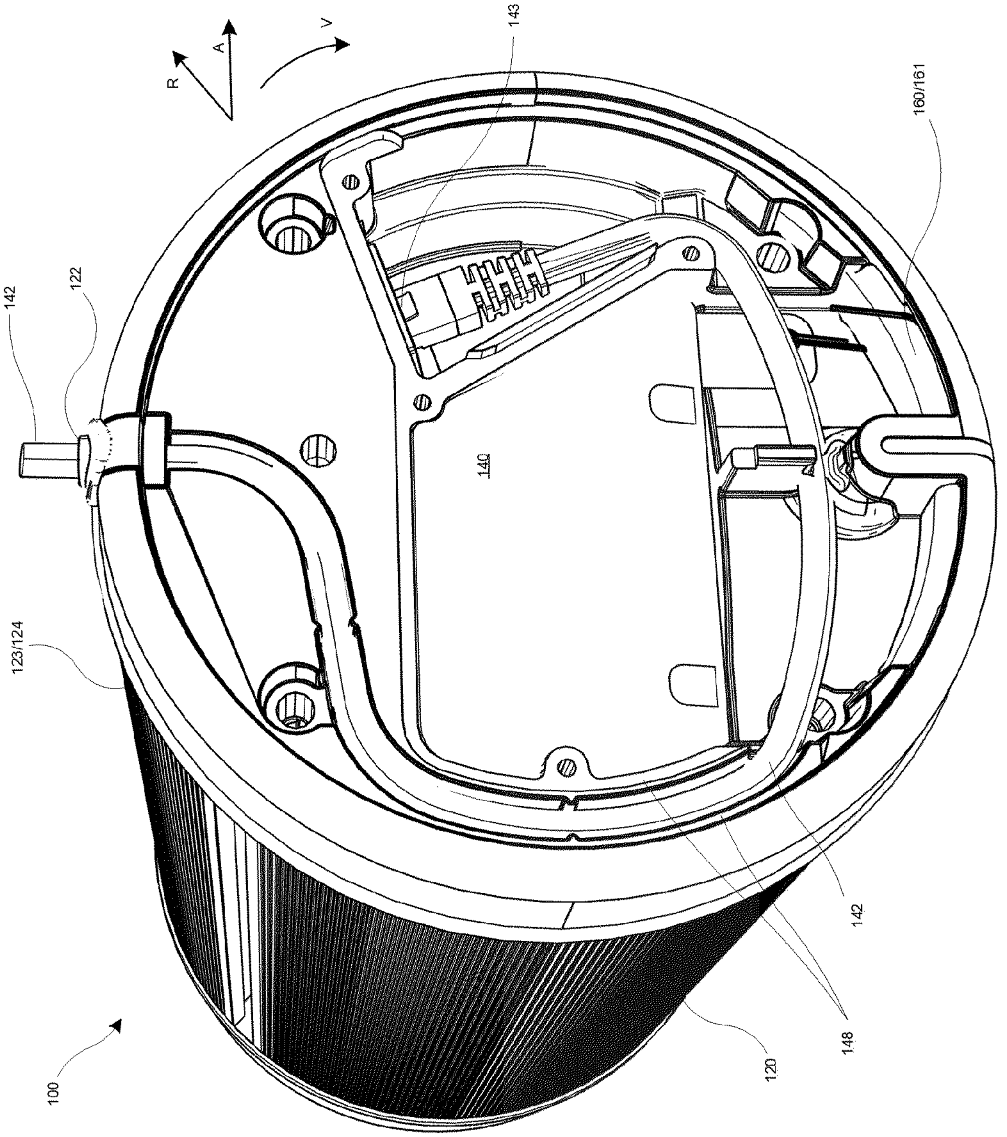
FIG. 4 is a back perspective view of the camera device illustrated in FIG. 1 with a service door removed.
Figure 5:
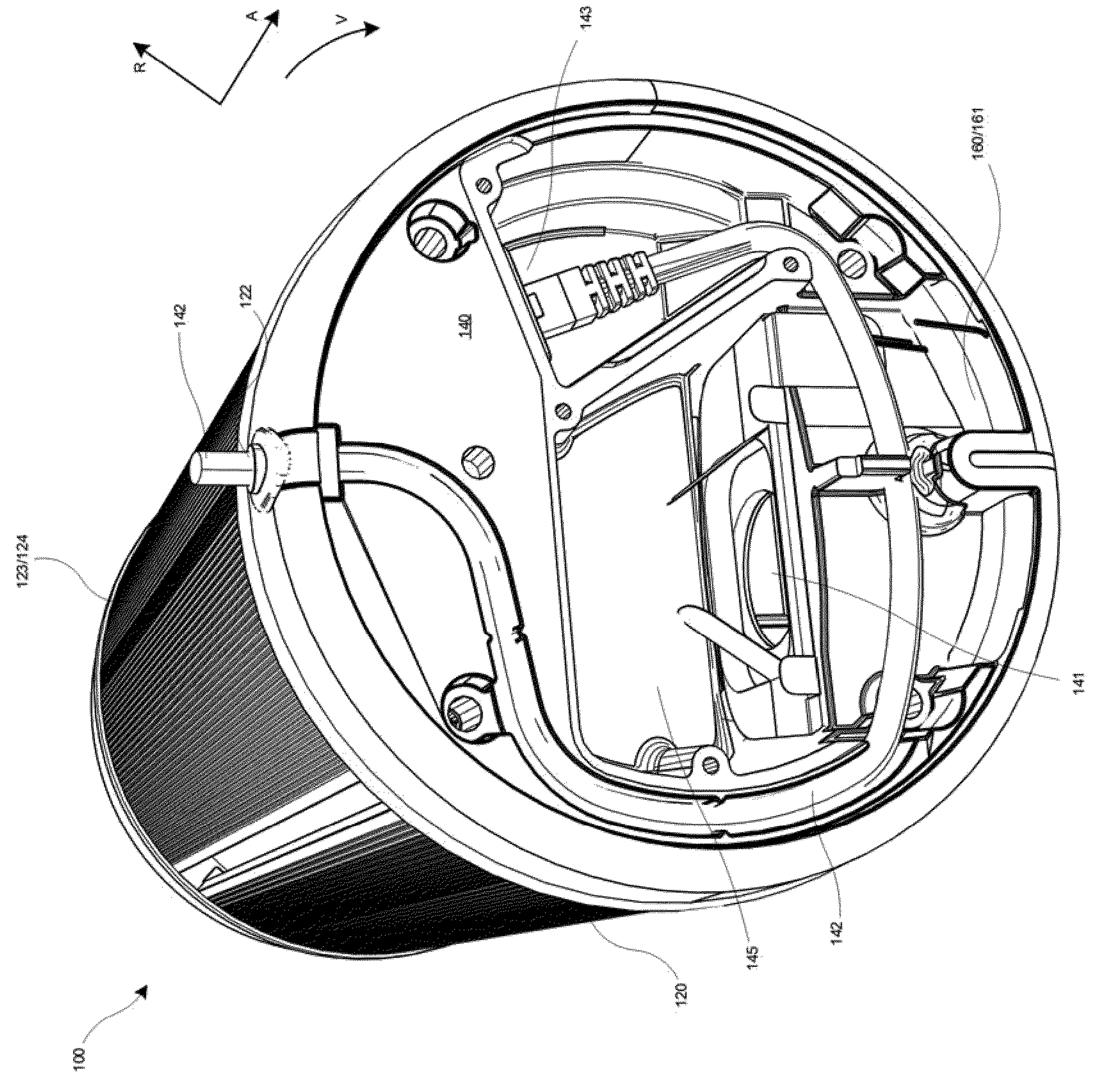
FIG. 5 is a back perspective view of the camera device illustrated in FIG. 1 with a service door and a part of an internal barrier wall removed.

The predetermined pattern, and in particular said U-shape, may be achieved by the cable 142 being placed in guiding tracks or fasteners 148 inside the first space 140, as is perhaps most clearly illustrated in FIG. 4.

Hence, all liquid water entering via lead-through hole 122 will travel along the cable 142, possibly also guided by said guiding tracks, downwards until it reaches the bottom of said U-shape. From there, the liquid water may run further downwards, such as by dripping or running, to a bottom of the first space 140.

From the bottom of the first space 140, such liquid water is drained via drain holes in the second enclosure 120. As will be described in further detail below, the camera device 100 may comprise an air inlet 160, 162 along the path P, through which air inlet 160, 162 air enters the camera device 100 when travelling along said path P. Such air inlet 160, 162 may then be configured to allow liquid water to drain therethrough from the first space 140 when the camera device 100 is in said mounted orientation. Generally, only small amounts of liquid water will be able to enter via the lead-through hole 122. As the only other way for liquid water to enter into the bottom of the first space 140 is via air inlets 160, 162 or outlets 164, that are all protected from rain from above, the air inlets 160, 162 will be able to supply intake air even if also draining any such liquid water.

Figure 9:
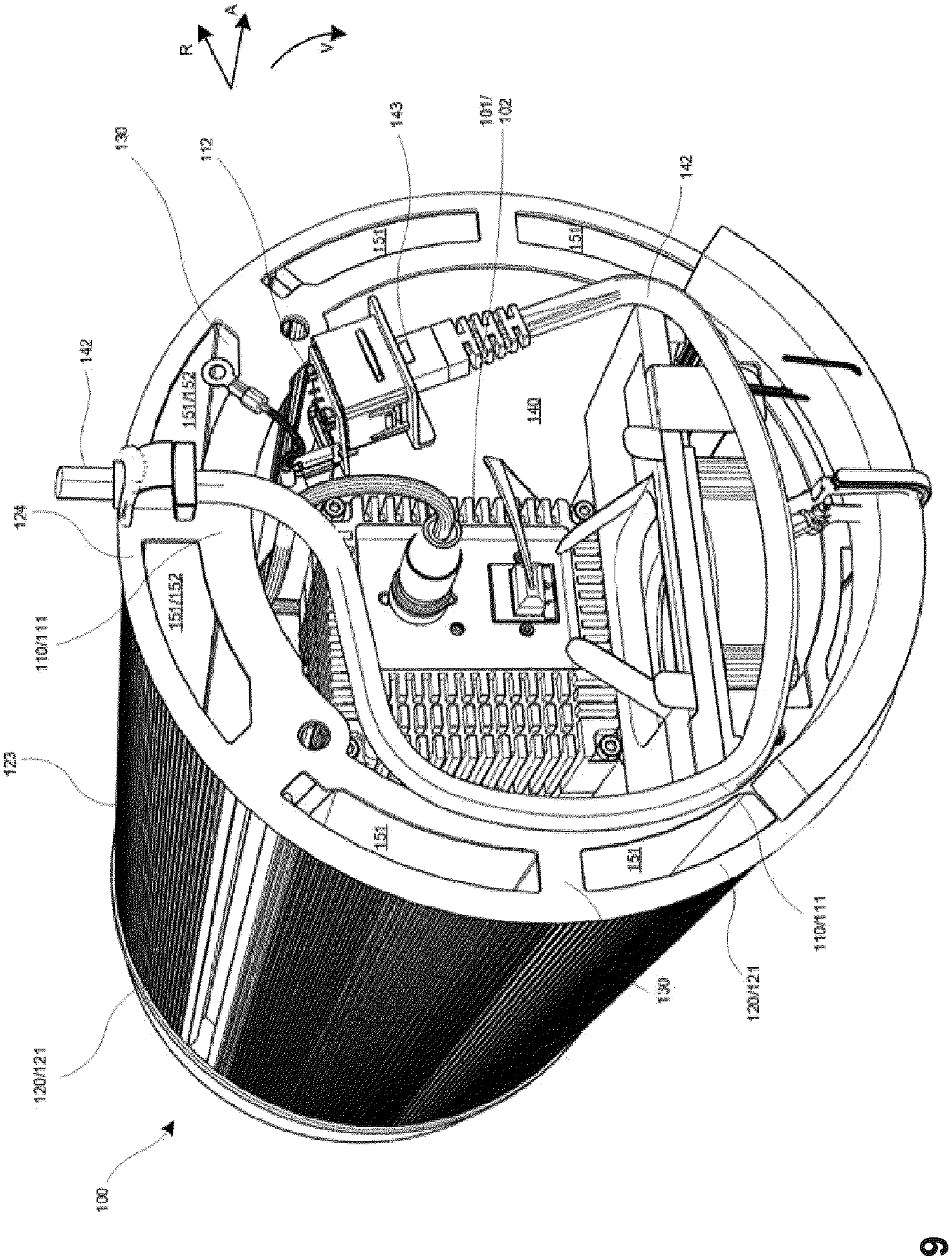
FIG. 9 is a cross-sectional back perspective view of the camera device illustrated in FIG. 1.

As is seen most clearly in FIGS. 3 and 4, the first space 140 may be a camera device 100 service space, accessible via a closable door 144 in the second enclosure 120. Hence, the closable door 144 may constitute or form part of a peripheral wall, such as an axially A rear wall, of the second enclosure 120. Via such a closable door 144, access may then be provided to the cable 142. Moreover, by removing an inner barrier 145, which may form a limiting wall of the first space 140, and which may be detachably fastened as a part of the first enclosure 110 using screws, snap-locks or other suitable fasteners, access to the camera 102 and/or any circuitry 101 may be provided also via the closable door 144. FIG. 9 illustrates a state in which the inner barrier 145 has been removed.

Figure 6:
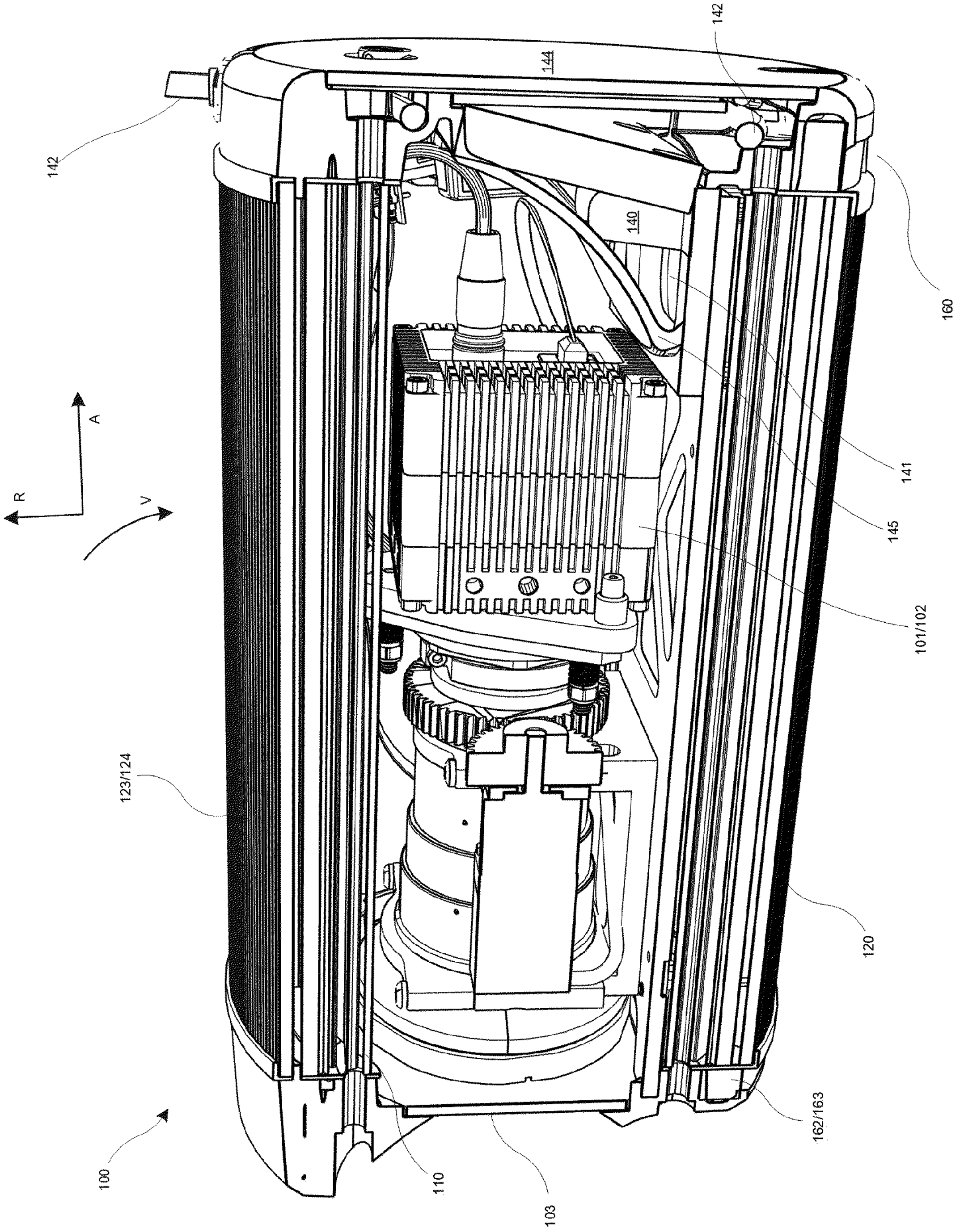
FIG. 6 is a cross-sectional side perspective view of the camera device illustrated in FIG. 1.

As is illustrated in FIGS. 6 and 7, the axially A rear part of the camera device 100, directly below the cable 142 when the camera device 100 is in the mounted orientation, there may be a combined air intake/drain through hole 160. As an alternative or supplement, there may be a combined air intake/drain through hole 162 at an axially front part of the camera device 100, communicating with the first space 140 via a lower channel 153 formed between a first enclosure 110 barrier wall and a second enclosure 120 barrier wall along a bottom of the second enclosure 120, the liquid water being able to run along said lower channel 153 after leaving the cable 142. Having draining holes 160, 162 in both front and rear parts is advantageous as it allows the camera device 100 to be mounted at different axial A angles in said mounted orientation.

Figure 8:
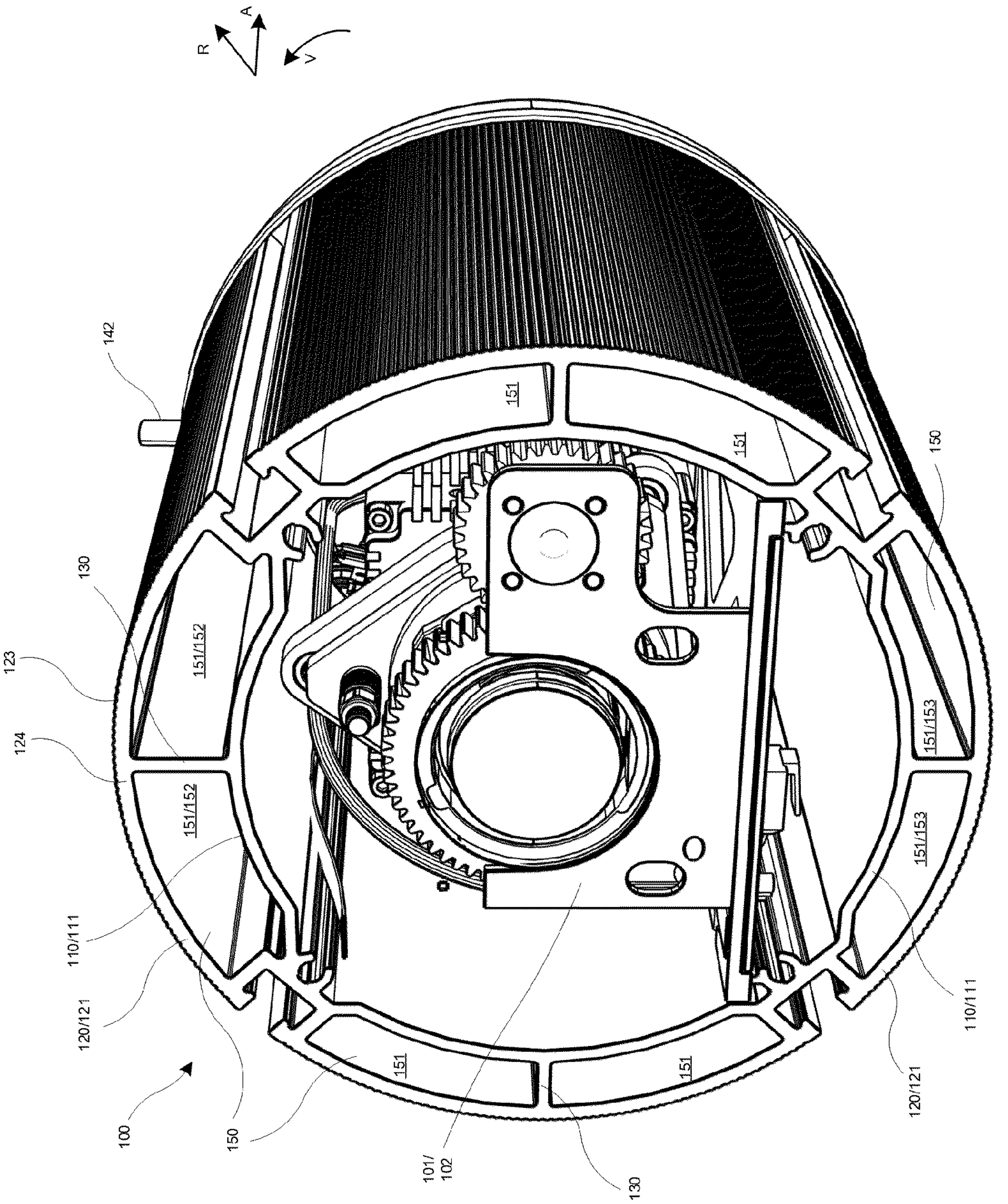
FIG. 8 is a cross-sectional front perspective view of the camera device illustrated in FIG. 1.

As is illustrated in the cross-sections viewed in FIGS. 7, 8 and 9, the first enclosure 110 and the second enclosure 120 may together form a second space 150 in the form of a double-walled enclosure. The second space 150 is hence contained in the second enclosure. The second space 150 may or may not communicate directly with the first space

140, but either way the path P preferably runs through both the first space 140 and the second space 150. For instance, the path P may run through the second space 150 before entering the first space 140; and/or run through the second space 150 after leaving the first enclosure 110.

As is also illustrated in FIGS. 8 and 9, the first enclosure 110 and/or the second enclosure 120 may each comprise a respective cylindrical part 111, 121. Such cylindrical parts 111, 121 may be circular-symmetric and/or concentric, and may be made from metal material, such as stainless steel or aluminum.

A particularly sturdy and reliable construction is achieved in case the cylindrical part 111, 121 in question is an extruded aluminum part, and further particularly in case said extruded aluminum part constitutes part of both the first enclosure 110 and the second enclosure 120. As is illustrated in the Figures, the first enclosure 110 and the second enclosures 120 may hence be formed from one and the same material body, that may be a metal material body, such as a one-piece extruded cylindrical aluminum body.

In this and in other cases, said second space 150 may be formed between the first enclosure 110 and the second enclosure 120. In particular, the camera device 100 may comprise connecting walls 130, connecting the first enclosure 110 to the second enclosure 120, such as connecting said cylindrical parts 111, 121. The connecting walls 130 may form part of said one-piece extruded aluminum profile.

Such construction will resist relatively powerful impacts from sports balls onto its mantle surface without breaking.

Moreover, the connecting walls 130 may divide the second space 150 into several, such as at least four, or even at least six, compartments 151, extending in an axial direction A of the camera device 100 and hence of said cylindrical part(s).

Such compartments 151 may form channels for cooling air along said path P. In the Figures, upper such channels 152 may be arranged to convey air in an axially A forwards direction, towards the air outlet 164 at the transparent component 103; whereas lower such channels 153 may be arranged to convey air in an axially A forwards direction, from the rear or first air inlet 160, or in an axially A rearwards direction, from the front or second air inlet 162.

Generally, the path P may pass through said second space 150 upstream of a point where the cooling air enters the first enclosure 110, such as before entering the first space 140, and/or downstream of a point where the cooling air exits the first enclosure 110.

More particularly, the path P may pass through said second space 150 downstream of a point where the cooling air exits the first enclosure 110 and upstream of the transparent component 103, via an upper channel 152 defined by a top wall 124 of the second enclosure 120 facing upwards in the mounted orientation of the camera device 100. This provides additional cooling of the camera device 100 at its top part 123, which may be exposed to direct sunlight during operation.

Each of the air intakes 160, 162, as well as the air outlet 164, may be provided with air filters 161, 163 and 165, respectively, of the camera device 100. Then, any cooling air must pass through such an air filter as it enters into and/or exits from the camera device 100. The air filters 161, 163, 165 prevent insects from entering into the second enclosure 120 from the external environment. The air filters 161, 163, 165 may be open-pore foam filters, such as is conventional as such. The air filters 161, 163, 165 may also be pleated filters with paper, metal (such as steel) mesh material filters or other types of filters.

The path P may run from one or two air intakes 160, 162 into the second enclosure 120 and into the first space 140 being arranged in the second enclosure 120; pass from the first space 140 into the first enclosure 110, such as via the fan 141; again pass out from the first enclosure 110 and into the second space 150 from where it exits via the air outlet 164.

Figure 10:
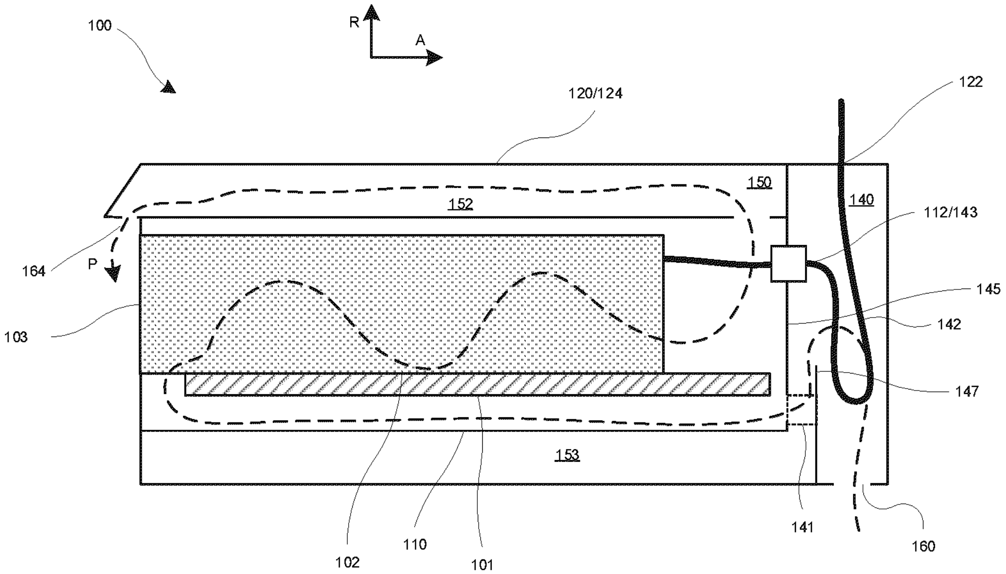
FIGS. 10-12 are respective simplified cross-sectional side views of camera devices according to second, third and fourth embodiments.
Figure 11:
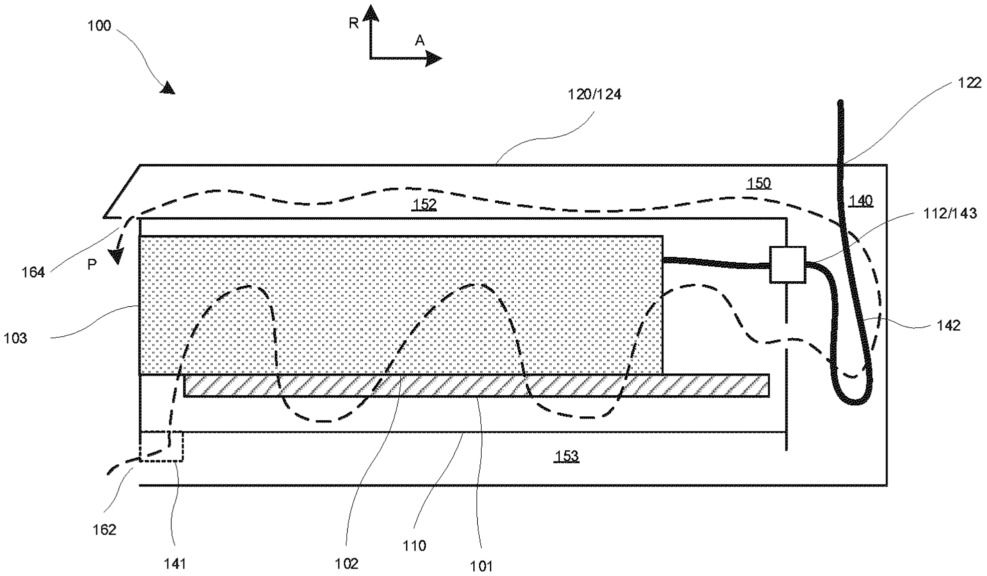
Figure 12:
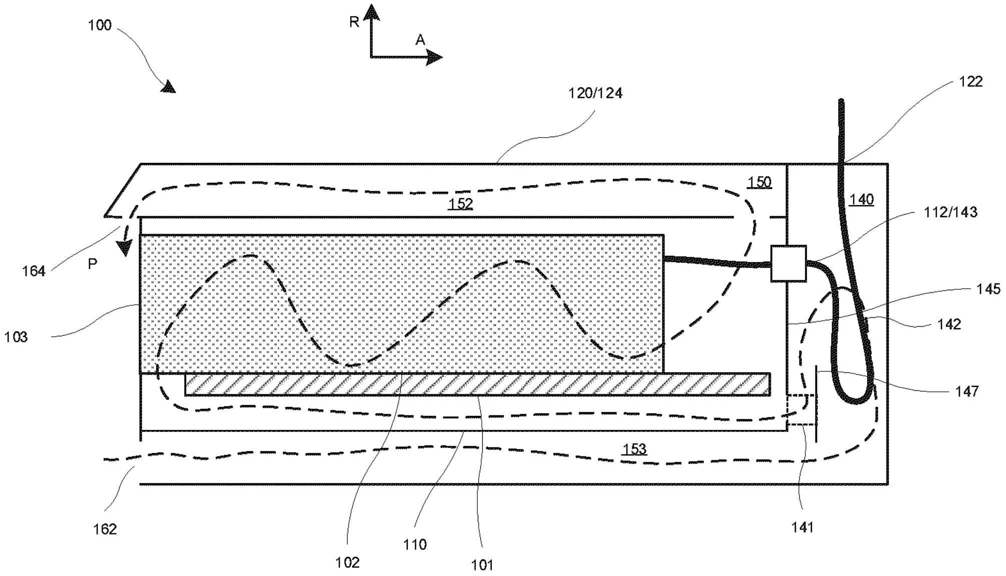

FIGS. 10-12 illustrate three different examples of how such a path P can be designed.

In FIG. 10, the air enters via the first air intake 160, into the first space 140. From there, the air passes, via the fan 141, into the first enclosure 110, where it passes on one side of a barrier inside the first enclosure 110, such as in the form of a circuit board of the circuitry 101, to an axially A front part of the first enclosure 110. Then, it flows, on the other side of said barrier, towards an exit hole at an axially A rear part of the first enclosure 110, making direct contact with the camera 102. Via the exit hole the air exits into the upper channel 152 of the second enclosure 120 up to the air outlet 164.

In FIG. 11, the air instead enters via the second air intake 162, into the second enclosure 120, and from there directly, via the fan 141, into the first enclosure 110, making direct contact with the camera 102. Via an exit hole at the axially A rear part of the first enclosure 110, the air exits into the first space 140, from where it exits via the upper channel 152 and the air outlet 164. It is noted that, in this example, the air flows through the first enclosure 110 before through the first space 140, which is opposite to the case illustrated in FIG. 10.

In FIG. 12, the air enters via the second air intake 162 and then flows, via the lower channel 153 to the first space 140. From there, it enters the first enclosure 110 via the fan 141, flows on one side of said barrier axially frontwards, and back axially rearwards on the other side of the barrier as described in connection to FIG. 10. It exits into the upper channel 152 and the air outlet 164.

It is understood that the principles illustrated in FIGS. 10-12 may be combined in various ways. For instance, cooling air may enter via both air intakes 160, 162 in parallel.

Figure 15:
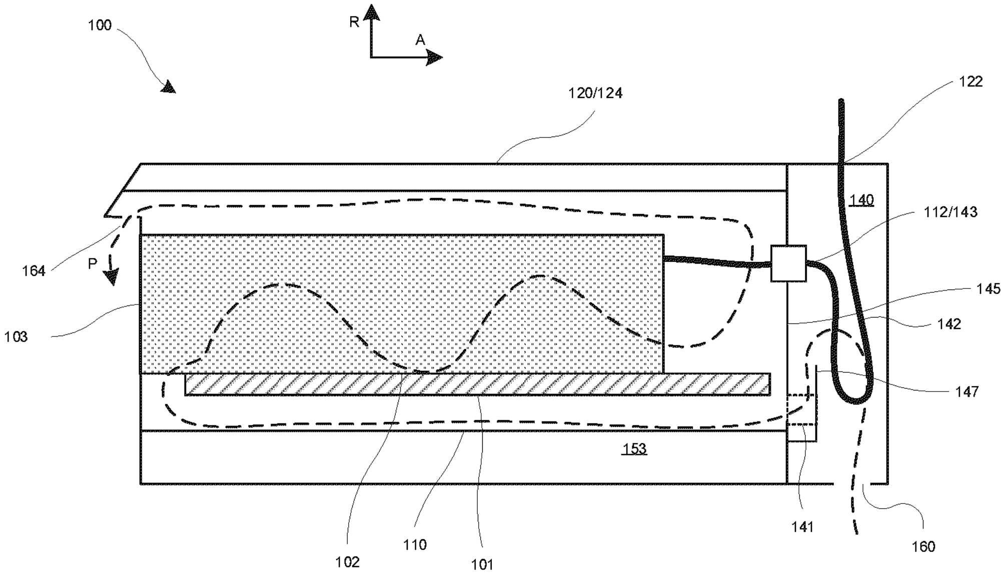
FIG. 15 is a simplified cross-sectional side view of a camera device according to a fifth embodiment.

FIG. 15 illustrates an embodiment in which the path P runs from one or two air intakes 160, 162 into the second enclosure 120 and into the first space 140; passes from the first space 140 into the first enclosure 110, such as via the fan 141; and out from the first enclosure 110 via the air outlet 164. It is noted that the air outlet 164 in this embodiment is hence arranged as an air exit from the first enclosure 110. Whereas the embodiment shown in FIG. 15 uses air intake 160, it is realized that the air intake 162 could be used instead or in addition, as is exemplified in FIGS. 11 and 12.

As illustrated in FIG. 7, air passing from the first space 140 into the first enclosure 110 may be forced to flow through a filter 146, that may be an open-pore foam filter or other types of filters as exemplified above. The filter 146 may also be an integrated part of the fan 141.

As illustrated in FIGS. 7, 10 and 12, air passing from the first space 140 into the first enclosure 110 may pass downwards towards and into the fan 141, on the other side of a dividing wall 147 horizontally (in the mounted orientation of the camera device 100) separating said downwards flow of cooling air from a bottom of the U-shaped cable 142, further providing a barrier from liquid water accidentally entering the fan 141 and therefore the first enclosure 110.

Above, preferred embodiments have been described. However, it is apparent to the skilled person that many modifications can be made to the disclosed embodiments without departing from the basic idea of the invention.

For instance, the camera device 100 may comprise additional component parts, apart from the ones discussed above and illustrated in the Figures.

The path P may be arranged in other ways than the ones described herein, as long as the disclosed principles are observed. For instance, the path P may be split into several parallel part paths. In other examples, the path may pass more (e.g., several) channels 150, in parallel and/or in series, than what is shown in the Figures.

One or several cables 142 may exit the camera device 100 from the sides of the camera device 100.

Hence, the invention is not limited to the described embodiments, but can be varied within the scope of the enclosed claims.

The invention claimed is:

1. A camera device associated with a mounted orientation for operational use, the camera device comprising:
- a housing, defining an air inlet and an air outlet, the air inlet opening downwards when the camera device is in the mounted orientation;
- an optically transparent component coupled with the housing to form an enclosed space into which water is unable to flow under an influence of gravity when the camera device is in the mounted orientation;
- a guiding surface associated with, or being part of, the air outlet, the guiding surface being configured and arranged to direct air flowing out of the air outlet toward or across the optically transparent component; and
- a camera, located inside the enclosed space and arranged to receive light passing through the optically transparent component,
- wherein the housing defines a path for the air from the air inlet to the camera and then to the guiding surface,
- wherein the path is defined so that the air is first heated by thermal contact with the camera and/or circuitry of the camera device and then passes an internal surface of the optically transparent component.

2. The camera device according to claim 1, wherein
- a part of the path passing through the enclosed space is defined to run from electric circuitry associated with the camera to the camera.

3. The camera device according to claim 1, wherein
- the camera device further comprises a fan configured to forcibly circulate said air along said path.

4. The camera device according to claim 3, wherein
- the path is defined to force the air to achieve said thermal contact with the camera and/or the circuitry, thereby cooling the camera and/or the circuitry.

5. The camera device according to claim 1, further comprising:
- a first enclosure defining, together with said optically transparent component, said enclosed space; and
- a moisture-open second enclosure, wherein
- the path is defined at least partly between the first enclosure and the second enclosure, and wherein
- the first enclosure and the second enclosure are arranged in relation to each other so that no water is able to, under influence of gravity, run into the first enclosure from the second enclosure when the camera device is in said mounted orientation.

6. The camera device according to claim 5, further comprising:
- a cable connecting, at a connecting point, to the first enclosure and passing between the first enclosure and the second enclosure through a first space, wherein
- the cable being arranged to guide moisture away from the connecting point.

7. The camera device according to claim 6, wherein
- the cable forms a U-shape inside said first space.

8. The camera device according to claim 6, wherein
- the cable exits the second enclosure at a lead-through hole of the second enclosure arranged on a top part of the second enclosure, so that the cable runs in a straight or oblique direction upwards through said lead-through hole when the camera device is in said mounted orientation.

9. The camera device according to claim 8, wherein
- the cable connects detachably to the first enclosure.

10. The camera device according to claim 9, wherein
- the first space is a camera device service space, accessible via a closable door in the second enclosure.

11. The camera device according to claim 6, wherein
- the air inlet is configured to allow water to drain therethrough from said first space when the camera device is in said mounted orientation.

12. The camera device according to claim 6, wherein
- the first enclosure and the second enclosure together form a second space in the form of a double-walled enclosure.

13. The camera device according to claim 12, wherein
- the first enclosure and/or the second enclosure comprises a respective cylindrical part.

14. The camera device according to claim 13, wherein
- said cylindrical part is an extruded aluminum part.

15. The camera device according to claim 14, wherein
- said extruded aluminum part constitutes part of both the first enclosure and the second enclosure.

16. The camera device according to claim 13, further comprising:
- connecting walls connecting the first enclosure to the second enclosure, wherein
- the connecting walls divide the second space into several compartments, extending in an axial direction of said cylindrical part.

17. The camera device according to claim 12, wherein
- the path passes through said second space upstream of a point where the air enters the first enclosure and/or downstream of a point where the air exits the first enclosure.

18. The camera device according to claim 17, wherein
- the path passes through said second space downstream of a point where the air exits the first enclosure and upstream of the guiding surface via a channel defined by a wall of the second enclosure facing upwards in the mounted orientation of the camera device.

19. The camera device according to claim 1, further comprising
- air filters through which the air must pass as it enters into and/or exits from the camera device, the air filters being open-pore foam filters, metal mesh material filters or pleated filters with paper.

20. The camera device according to claim 19, wherein
- the camera device is arranged to be mounted in an outdoor environment for visualizing a trajectory of a moving object and to provide image information regarding said visualization via said cable.

21. The camera device according to claim 20, wherein
- the moving object is a golf ball.

* * * * *